Aug. 12, 1941.  G. H. WILSON  2,252,537

SPLASH GUARD FOR MOTOR VEHICLES

Filed Sept. 6, 1939

Inventor
G. H. Wilson
By: Glascock Downing & Seebold
Attys.

Patented Aug. 12, 1941

2,252,537

UNITED STATES PATENT OFFICE 2,252,537

SPLASH GUARD FOR MOTOR VEHICLES

George Henry Wilson, Kurting, Victoria, Australia

Application September 6, 1939, Serial No. 293,642
In Australia October 4, 1938

5 Claims. (Cl. 293—55)

An object of my invention is to supplement the degree of protection of motor vehicle headlamps, wind screens, and body front upper surfaces—especially those of cars which are streamlined—from mud, dirt, and dirty water and which are not shielded by the usual front wheel fenders or mud-guards. When roads are rough and wet, especially when there is wind, and cars thereon are travelling fast, it is found that notwithstanding their ordinary front wheel mudguards their tires splash mud and road material high into the air, and some of it alights on and adheres to the aforesaid parts of advancing cars, and sometimes reaches car occupants. Such effects are dangerous to traffic, as they obscure the driver's vision, and they may lead to serious accidents; they also cause slowing down or stoppages. They also mar the surfaces of cars and detract from their groomed appearance.

In this specification, road matter thrown or splashed up and scattered by tires is, for brevity, termed mud, some of the scattering occurring fanwise—upwardly and forwardly, and to left and right.

As the course of road material thrown up by car rear wheels is very different from the course taken by material raised by the front wheels, this invention has no relation to the effects of rear wheels, and no rear part of a car is referred to hereafter, my invention not being adapted for rear use.

I provide mud intercepting devices, herein called splash guards, which can be of pleasing appearance, easy to attach to or remove from a car, easy to keep clean, and having other advantages. They may, if desired, be fixed to the car.

One arrangement I use is illustrated by the accompanying drawing. I vary relative sizes, positions and numbers, and minor details of the parts according, for example, to the frontal construction of the car to which the invention is to be applied.

In each figure of the drawing, except Figure 1, a bumper bar or part thereof is indicated, and in Figures 2, 4, and 5 a few other car parts appear.

A represents a road surface, B part of a motor car body, C part of a front tire, D part of a bumper bar; and E, $E^1$ are brackets extending from the car front and supporting the bumper bar.

Figure 5:
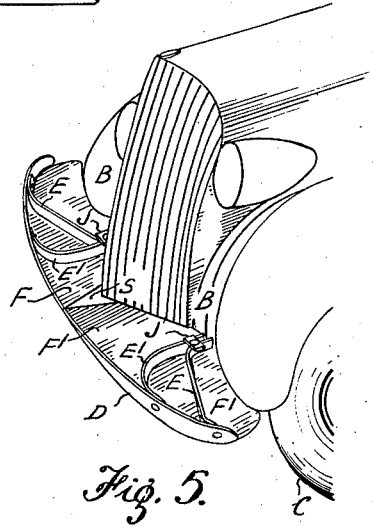
Figure 5 is a perspective view of a car front carrying my splash guards.
Figure 4:
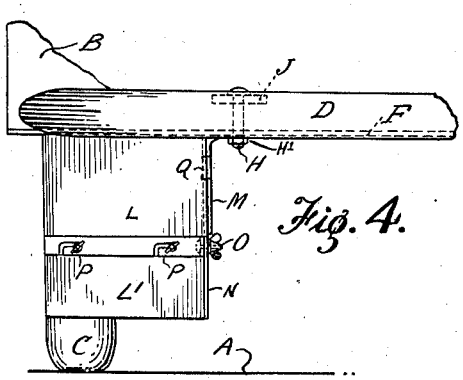
Figure 4 is a front elevation showing the said half.

I provide mud intercepting main plates, F, $F^1$, at and extending across the car front, and having a form to at their rear fit close to the car body front to prevent spattering of mud between the body and the rear of the plates. In Figure 5 the car illustrated is one of modern and well known type. The front edges of my plates are located near the bumper bar, their rears being marked G.

Main plates are satisfactory when set as shown horizontal, but there may be provision for setting them so that their upper surfaces slope and are, for example, slightly higher or lower at the rear than at the front.

In cases in which main plates are used which have their fronts forward of the bumper bar, the fronts are of rubber sheet, or similarly made yielding, and will be uninjured, or not greatly injured, by collisions.

Figure 2:
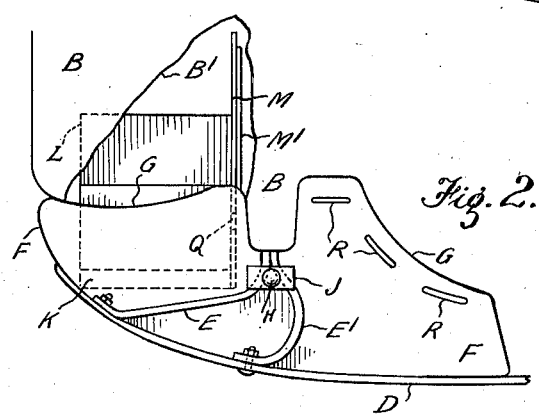
Figure 2 is a plan showing one half of my attachment.
Figure 3:
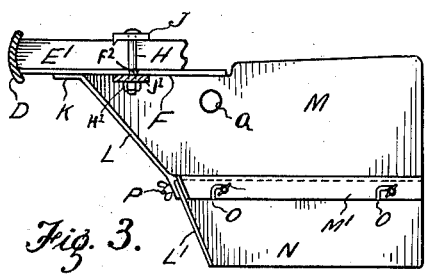
Figure 3 is a side elevation showing the said half.

Any obviously suitable plate fastening means is usable. Thus I provide in each plate a hole or slot $F^2$ through which is passed a bolt H, one end of which bears against a plate J or the like which (see Figure 2) rests on available supports, namely bracket arms E, $E^1$—each bolt, at its other end, carrying a nut $H^1$ bearing on a washer $J^1$ against a main plate underside, the use of a washer being optional.

Instead of using the said bolts each plate is pivotable to any convenient support, as the bumper bar, and these pivoted plates are movable so as to, when required, swing their under faces upwardly into view from above, and, amongst other advantages, facilitate cleaning.

Contrary to what many would infer, these main plates do not stop all mud splashing that it is desirable to stop. Therefore I provide additional mud stoppers as next described. I provide each plate with an underset rearwardly extending mud stopping means, herein called a fin M, and an underset transversely extending mud stopping means herein called a wing L. Each fin and wing carries removable and replaceable flexible members herein called curtains, N and $L^1$ respectively, or like suitable downward extensions which reach nearly to the ground. A part M¹ of curtain N is shown attached to the adjacent fin by pins passed through bayonet slots O, and made fast, by wing nuts for example. Curtain L¹ is shown attached to wing L by bayonet slot devices P. Curtains are, however, supportable by hinges, and are preferably of rubber or flexible sheets which are light, durable, almost soundless, and easy to clean. Such curtains when removed may easily be stored in any convenient space. None of the said curtains will push forward stones or other road obstructions which offer substantial resistance: these will pass under the curtains.

As a whole the attachments below the main plates are set so that they reach so near the ground or track as to yield in conjunction with the main plates thorough efficiency as mud stoppers, when the roads are muddy.

At will I slot or aperture mud stoppers M to facilitate oiling car under parts; thus an aperture to admit the end of a grease gun is shown at Q by way of example.

In one construction in which this invention is embodied a single main plate is installed, substitutable for plates F, F¹. This single plate extends the full width transversely of the car body front, and from close to said front forward to the front bumper. Whether there be provided a narrow space S or not (referred to below) is optional.

Figure 1:
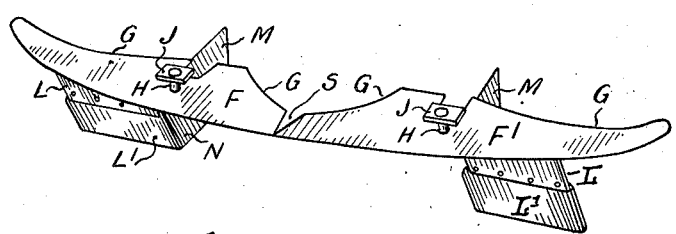
Figure 1 shows in perspective one form of my construction to be attached to a car front.

I may provide means to facilitate run off of water from a main plate. Thus when the main plate comprises two parts as in Figure 1 a narrow space S is, in one form of my device, left between them, and it is optional to provide in any main plate water outlets or escape channels as indicated by apertures R.

I claim:

1. In a motor vehicle fitted with a front bumper, a transverse mudguard extending from side to side of the bumper and from the bumper to the vehicle body front, a downwardly and transversely extending additional mud stopper arranged under and near each end of said mudguard and a flexible curtain on each mud stopper to yield to and pass over low road obstacles, said additional stopper being positioned forwardly of and constructed considerably wider than a front wheel of the vehicle.

2. A device as claimed in claim 1 in which there is provided at least one aperture in the downwardly and transversely extending mud stopper for introduction thereinto of suitable lubricants.

3. A device as claimed in claim 1 in which the transverse member slopes in an upward direction from front to rear.

4. A device as claimed in claim 1 in which the transverse horizontal member is provided with a drainage opening in the central portion thereof.

5. A device as claimed in claim 1 in which the downwardly and transversely extending additional mud stoppers are extended longitudinally rearwards under the body front at the inner sides of the respective front wheels.

GEORGE HENRY WILSON.